3,188,311
PROCESS FOR THE PREPARATION OF 7-AMINO-
CEPHALOSPORANIC ACIDS
Robert B. Morin, Edwin H. Flynn, Billy G. Jackson, and
Roger W. Roeske, all of Indianapolis, Ind., assignors to
Eli Lilly and Company, Indianapolis, Ind., a corporation of Indiana
No Drawing. Filed Apr. 3, 1961, Ser. No. 100,018
12 Claims. (Cl. 260—243)

The present invention relates to antibiotic substances. More particularly, it relates to 7-aminocephalosporanic acids and to a means for the preparation thereof from antibiotics of the class of cephalosporin C.

Cephalosporins of the class represented by cephalosporin C are antibiotic substances elaborated by molds of the species represented by Cephalosporium sp. ATCC 11,550. These substances are characterized structurally by containing the substituted bicyclic configuration

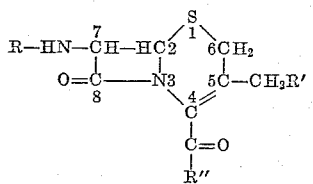

where substituents R, R', and R'', defined hereinafter, are characteristic of the individual cephalosporin. Cephalosporin C is 7-(5'-amino-N'-adipamyl)cephalosporanic acid

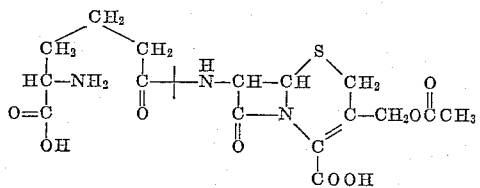

A method for producing cephalosporin C by fermenting a nutrient medium with an appropriate Cephalosporium strain, then separating the cephalosporin C from the fermentation product, is described in British patent specification 810,196, published March 11, 1959.

Cephalosporin C is an acidic antibiotic substance having an activity of a low order compared with the penicillins. It is active to some degree, however, against both Gram-positive and Gram-negative organisms; it is insensitive to penicillinase; and it is more acid stable than the penicillins. For these reasons it is of considerable interest for therapeutic purposes despite the low magnitude of its antibiotic activity.

The structural feature of the cephalosporins which is essential to their antibiotic activity has not been identified, but presumably involves the 7-amino derivative of the bicyclic portion of the molecule, which for convenience may be termed the "nucleus." It has therefore been of interest to prepare other derivatives of the nucleus for antibiotic screening. For this purpose, a supply of cephalosporin nucleus has been needed, but no means has existed until now of obtaining the nucleus in more than trace quantities.

One object of the present invention is to prepare and recover 7-aminocephalosporanic acids from antibiotics of the class of cephalsporin C.

Another object is to improve the recovery of cephalosporin C nucleus, 7-aminocephalosporanic acid.

Another object is to improve the preparation of antibiotic substances based upon nuclei derivable from antibiotics of the class of cephalosporin C.

Other objects of the invention will be apparent from the following description and claims.

In accordance with the present invention, a cephalosporin C compound containing the characteristic 5'-amino-N'-adipamyl group in the 7 position is subjected to treatment under conditions effective serially or concertedly (1) to convert the 5'-amino-N'-adipamyl group into an intermediate having an electron-deficient center at the 5' carbon atom, (2) to cyclize the intermediate at the 5' position through the side-chain amido oxygen, presumably into the imino lactone, and (3) to split off the cyclic lactone from the imino nitrogen atom to which it is attached, leaving the corresponding 7-aminocephalosporanic acid as the end product.

7-aminocephalosporanic acid and its variant compounds, noted below, are useful as intermediates in the preparation of derivatives having antibiotic properties. Such derivatives are readily prepared by acylation of the 7-amino group in accordance with well-known procedures, exemplified below.

In one embodiment of the invention, cephalosporin C is suspended in an inert polar organic solvent (i.e., a solvent for cephalosporin C which does not react deleteriously under the process conditions with cephalosporin C or in any of the process materials, intermediates, and products), and the suspension is treated with nitrosyl chloride or other nitrosating agent in a quantity sufficient to react with substantially all of the 5'-amino group. Upon completion of the reaction, any unreacted nitrosating agent may be destroyed or removed if desired. The reaction mixture is then adjusted to around pH 2.5 to 5 with dilute aqueous alkali, which serves the purpose of cleaving the postulated imino linkage and permitting the formation of the 7-aminocephalosporanic acid inner salt, which crystallizes. The product is separated from the crystallization mixture, and is washed and dried.

In another embodiment, cephalosporin C is dissolved in a suitable solvent, and the solution is reacted with N-bromosuccinimide or other substance affording positive halogen in a quantity sufficient to react with substantially all of the 5'-amino group. The primary reaction product is believed to cyclize at the 5' position through the side-chain amido oxygen, presumably forming the imino lactone, and the cyclic lactone is readily split off hydrolytically from the imino nitrogen to which it is attached, yielding the desired 7-aminocelphalosporanic acid.

In another embodiment, celphalosporin C is dissolved in a suitable solvent, and the solution is reacted with benzenediazonium chloride or other arenediazonium salt in a quantity sufficient to react with substantially all of the 5'-amino group. The reaction is believed to convert the 5'-amino group into a linear triazine derivative which readily cleaves at temperatures from around 0 to 100° C., leaving an electron-deficient center at the 5' position. The resulting modified adipamyl group cyclizes to the imino lactone, and the lactone hydrolytically cleaves from the imino nitrogen atom to which it is attached, leaving the desired 7-aminocephalosporanic acid as the end product.

The mechanisms through which the various reactions proceed have not been established with certainty, and the precise nature and structure of the intermediates are unknown. As one plausible hypothesis, however, the following mechanism is suggested, the intermediates being those considered most likely in the method employing a nitrosating agent:

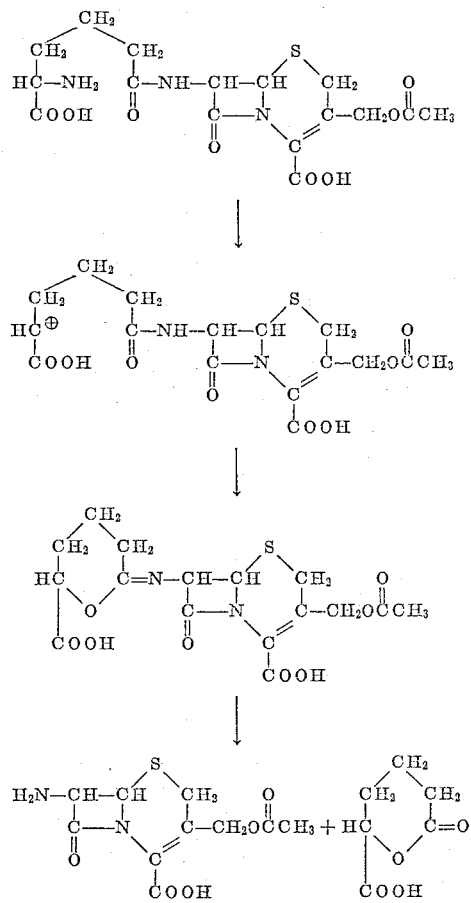

From the foregoing it will be seen that the initial reaction stage produces an electron-deficient center at the 5' position of the N'-adipamyl group, and that the latter cyclizes spontaneously to form the imino lactone. If the reaction medium includes any substantial proportion of water, the hydrolytic cleavage of the lactone from the imino nitrogen likewise proceeds spontaneously to product the desired 7-aminocephalosporanic acid. If, however, the reaction medium is initially anhydrous or substantially anhydrous, the hydrolytic cleavage can be effected by adding water thereto, either as a separate operation or as a part of the product recovery steps.

In a more specific embodiment of the invention, cephalosporin C is dissolved in aqueous 98 percent formic acid to a concentration of about 30 percent by weight. The solution is stirred and cooled in an ice bath to around 10° C., and to it is added nitrosyl chloride in about 2:1 molar ratio to the cephalosporin C, the nitrosyl chloride being added portionwise in the form of a 10 weight-percent solution in aqueous 98 percent formic acid over a period of about one minute. The temperature is maintained under 50° C. during the addition, and stirring is continued for about five minutes after addition is complete. The reaction mixture is then evaporated at reduced pressure and room temperature to remove all but a small proportion of the formic acid. The residual material is commingled with about 5 volumes of water, and the resulting solution is adjusted to around pH 3.5–4 with dilute aqueous sodium hydroxide solution, thereby precipitating the 7-aminocephalosporanic acid in the form of its zwitterion, in which form it is least soluble in water. The product is filtered off, washed with aqueous acetone, and dried.

The cephalosporin C compound employed as the starting material in the invention can be used in either crude or purified condition, and in the form of the free acid or a salt thereof, chosen for its solubility in the reaction medium. Suitable salts include the sodium, potassium, lithium, and other metallic salts. Ammonium and substituted-ammonium salts can also be employed, including the ammonium, monoethylammonium, dimethylammonium, diethylammonium, diisopropylammonium, trimethylammonium, tetramethylammonium, tetraethylammonium, and methyldiisopropylammonium salts, and the like. Of these, the tertiary and quaternary-ammonium salts are preferred, since they are less readily attacked by the treating agents.

The reaction medium should preferably be a polar organic liquid which is substantially inert under the reaction conditions employed and which dissolves the cephalosporin C compound to at least some degree. In this context, an "inert" liquid is to be understood as a liquid which does not react detrimentally with the starting materials, process materials, or reaction products under the conditions employed in the process. The reaction medium should preferably dissolve the cephalosporin C compound to the extent of at least about 0.5 percent by weight, but substantial conversion is obtainable with media in which the solubility is as little as 0.1 percent by weight. The reaction mixture may contain more or less water, depending upon the treating agent employed. With nitrosating agents, the medium should contain not more than about 25 percent by weight of water, preferably not more than about 10 percent. With the benzenediazonium salts, the medium may be entirely water. A preferred reaction medium for use with nitrosating agents is formic acid. Other media, suitable for use with a variety of treating agents, include acetic acid, propionic acid, trifluoroacetic acid, dimethyl sulfoxide, and the like. Mixed reaction media can also be employed, such as mixtures of formic acid with acetic acid, acetic acid with acetic anhydride, dimethylformamide with water, acetonitrile with water, dimethyl sulfoxide with water, and the like.

Suitable substances for reacting with the 5'-amino-N'-adipamyl group include, without limitation, the following: (1) nitrosating agents, such as nitrosyl chloride, nitrosyl bromide, nitrous acid, nitrogen dioxide, nitrogen tetroxide, nitrogen trioxide ($NO.NO_2$), alkyl nitrites, N-nitroso-3-nitrocarbazole, nitrosylsulfuric acid, nitrosyl fluoborate, and the like, nitrosyl chloride being preferred; (2) substances affording positive halogen under the reaction conditions, such as N-bromosuccinimide, N-chlorosuccinimide, N-bromophthalimide, N-chlorophthalimide, N-bromoacetamide, and the like; and (3) arenediazonium salts such as benzenediazonium chloride, naphthalenediazonium chloride, and the like.

The proportion of such treating agents should be at least equimolar in order to react substantially completely with the 5'-amino group of the cephalosporin C compound, and is preferably around 2:1 molar when the reaction system is anhydrous or substantially anhydrous. When the reaction system contains any substantial proportion of water, however, the reaction tends to go all the way to the desired nucleus, and the 7-amino group of the nucleus is open to attack by the treating agent in the same way as the 5'-amino group, thus tending to destroy the desired product. In such case, it is desirable to limit the proportion of treating agent so as to minimize the destruction of the product, and a balance must be made between the requirement for complete conversion of the 5'-amino group and the incidence of degradation reactions at higher proportions of treating agent. In an aqueous system, it is generally desirable to limit the molar proportion of treating agent to cephalosporin C compound to considerably less than 2:1—e.g., from about 1.1:1 to about 1.5:1.

The conversion of the 5'-amino-N'-adipamyl group is conveniently carried out at or around room temperature, e.g., from about 20 to about 30° C. Lower temperatures can be employed, e.g., —10° C. or below, so long as the reaction mixture remains fluid. Higher temperatures (above about 50° C.) tend to give lower yields through degradation reactions. A short reaction time favors higher yields, and to this end it is preferred to complete the addition of the treating agent as rapidly as possible, preferably in around 1 to 5 minutes or less, and to allow the reaction mixture to remain in contact with the unreacted treating agent for as short a time as possible.

The primary reaction product, which is considered to be an intermediate having an electron-deficient center at the 5' position, is believed to cyclize spontaneously, forming a cyclic lactone by interaction between the electron-deficient center and the side-chain amido oxygen (as distinguished from the cyclic β-lactam oxygen). When the reaction mixture contains water, the lactone undergoes spontaneous hydrolytic cleavage from the imino nitrogen to which it is attached, yielding the desired 7-aminocephalosporanic acid. When the reaction product mixture contains little or no water, the cleavage is brought about by adding water in a subsequent operation.

If, in the use of a nitrosating agent, any unreacted nitrosating agent remains in the mixture after the desired reaction is complete, it can be removed, if desired, by distillation if the nitrosating agent is sufficiently volatile, or by decomposition by adding a sufficient quantity of ammonia, a primary amine, or a primary urea to the reaction mixture. Such added materials, unless present in massive quantities, do not interfere with the subsequent isolation of the nucleus.

The recovery of the 7-aminocephalosporanic acid from the reaction product mixture is readily accomplished by a variety of techniques.

In one technique, the reaction medium is largely removed by evaporation at reduced pressure and ordinary temperature, leaving crude 7-aminocephalosporanic acid or the precursor imino lactone in the form of an oil, gum, slurry, or solid. This residue is dissolved in water, which hydrolyzes any precursor imino lactone. To the solution is added an aqueous sodium hydroxide solution or other aqueous alkali to a pH between about 2.5 and 5, preferably around 3.7. This results in precipitation of the 7-aminocephalosporanic acid in the form of the zwitterion. The precipitate is filtered off, washed successively with cold water and aqueous acetone, and dried.

In a modification of this technique, the reaction product mixture, after hydrolytic cleavage with an effective amount of water, is diluted with an antisolvent for the 7-aminocephalosporanic acid compound in a quantity sufficient to precipitate the latter. The crude precipitated material is separated by filtration, centrifugation, or the like, and is purified by dissolving in water and reprecipitating at a pH between about 2.5 and 5. As an example of this technique, the reaction product mixture obtained with 90 percent formic acid as the reaction medium is diluted with from 1 to 5 volumes of diethyl ether, thus throwing crude 7-aminocephalosporanic acid out of solution. The precipitate is separated, dissolced in water, adjusted to pH 3.7, and recrystallized. The ether is separated from the formic acid, and the ether and formic acid are recycled.

In another modification, an aqueous solution of crude 7-aminocephalosporanic acid is treated with activated carbon, which absorbs the 7-aminocephlosporanic acid values. The carbon is washed with water, and the 7-aminocephalosporanic acid values are eluted with aqueous 10-40 percent acetone.

In a further modification, an aqeuous solution of crude 7-aminocephlosporanic acid is passed at pH 6-7 through a strong anion-exchange resin, the resin is washed with water, and the 7-aminocephalosporanic acid values are eluted therefrom with aqueous acetic acid at increasing concentrations up to about 1 N.

In another method for recovering 7-aminocephalosporanic acid from the crude reaction product mixture, water is added directly thereto, and the reaction medium is removed by distillation of the azeotropic mixture thereof with water at reduced pressure and ordinary temperature, leaving an aqueous solution from which the 7-aminocephalosporanic acid is readily recovered by one of the methods noted above.

In another method, an aqueous solution of the crude nucleus can be subjected to acylation under conventional conditions to produce the corresponding 7-acylamidocephalosporanic acid. For this purpose, a variety of acylating agents can be employed, including acetyl chloride, phenylacetyl chloride, phenylmercaptoacetyl chloride, the corresponding bromides, and the like. The acylation is conveniently carried out by adding an equal volume of acetone to the aqueous solution of the nucleus, then adding the acylating agent in acetone solution, preferably in equimolar proportion to the nucleus. The acylation reaction proceeds readily and rapidly at room temperature, the pH being maintained between about 5 and about 9. The resulting acylated derivative is conveniently recovered in the form of its free acid by extraction at around pH 2 with an organic solvent such as ethyl acetate. For further purification, the acyl derivative can be re-extracted from the organic solvent with dilute aqueous base at a pH between about 5.5 and 7.5, after which the aqueous solution is evaporated under reduced pressure and the product is crystallized therefrom. Its identity is readily confirmed by infrared analysis, ultraviolet analysis, paper electrophoresis, and paper chromatography with concomitant bioautographic assay.

The identity of the 7-aminocephalosporanic acid nucleus can be confirmed by X-ray diffraction, or by paper chromatography and bioautographic assay against B. subtilis. For the latter purpose, the crude reaction product, after removal of the reaction medium, is taken up in water and adjusted to pH 6 to 7 with dilute aqueous sodium hydroxide solution. Paper chromatography is carried out in duplicate using 7:3 n-propanol-water or 4:1:5 butanol-ethanol-water as the solvent. The paper chromatograms are subjected to bioautographic assay against B. subtilis, one of them being first subjected to acylation with, for example, phenylacetyl chloride. It is found that the spot corresponding to the 7-aminocephalosporanic acid appears on the bioautogram only after acylation, unless very large amounts are present, owing to the low antibiotic activity of the nucleus.

The present invention is applicable to the treatment of the class of substances having the bicyclic cephalosporan C nucleus, including cephalosporin C itself, cephalosporin $C_A$, cephalospohin $C_c$, and desacetylcephalosporin C, to produce the respective bicyclic nuclei, containing in each case the characteristic 5,6-dihydro-2H-1,3-thiazine ring with a fused β-lactam ring in the 2,3 position. The end product has a structure represented by the following formula,

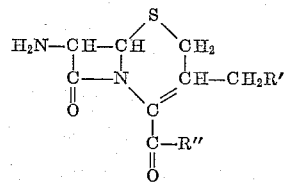

where R', taken alone, is —OH, $C_1$–$C_8$ acyloxy, or tertiary-amino, R" is —OH when R' is —OH, R" is —OH when R' is $C_1$–$C_8$ acyloxy, R" is —O— when R' is tertiary-amino, and R' and R", when taken together, are —O—. Thus, R' can be acetoxy, propionoxy, butyroxy, capryloxy, N-pyridyl, N-pyrimidyl, trimethylamino, triethylamino, tributylamino, and the like. Cephalosporin C nucleus is 7-aminocephalosporanic acid, in which R' is acetoxy and R" is —OH. In the nucleus of the cephalosporin $C_A$ type of compound, R' is tertiary-amino and R" is —O—. In the cephalosporin $C_c$ nucleus, R' and R" together are —O—, forming a fused gamma-lactone at the 4,5 position. In each case, the parent compound from which the nucleus is derived is the corresponding compound containing the 7-(5'-amino-N'-adipamyl) group instead of the 7-amino group.

Cephalosporin C is readily converted into cephalosporin $C_c$ by refluxing in water under acid conditions, as described in Belgian Patent 593,777, published November 30, 1960. This removes the acetyl group from its point of attachment to the methyl group in the 5 position of the thiazine ring, and lactonization then spontaneously occurs, yielding the fused cyclic lactone.

Cephalosporin C is also readily converted into compounds of the cephalosporin $C_A$ type by refluxing in aqueous solution with an excess of pyridine, for example, as described in Belgian Patent 593,777. The reaction is applicable in general to the tertiary amines, yielding corresponding derivatives of the cephalosporin $C_A$ type wherein the tertiary amine is attached to the methyl group in the 5 position of the thiazine ring, and forms an inner salt with the carboxyl group in the 4 position. Thus, derivatives of the cephalosporin $C_A$ type can be prepared by reacting cephalosporin C with nicotine, nicotinic acid, isonicotinic acid, nicotinamide, 2-aminopyridine, 2-amino-6-methylpyridine, 2,4,6-trimethylpyridine, 2-hydroxymethylpyridine, sulfapyridine, 3-hydroxypyridine, pyridine-2,3-dicarboxylic acid, quinoline, sulfadiazine, sulfathiazole, picolinic acid, and the like.

Desacetylcephalosporin C is conveniently prepared by treating cephalosporin C with citrus acetylesterase for several hours in aqueous phosphate buffer at pH 6.5–7 according to the method of Jansen, Jang, and MacDonnell, Archiv. Biochem., 15 (1947), 415–31.

The invention will be more readily understood from the following operating examples, which are submitted for illustration only, and not by way of limitation. In each of the examples, the cephalosporin C was used in the form of the dihydrate of the sodium salt.

*Example 1*

Forty grams of cephalosporin C were dissolved in 150 ml. of 98 percent formic acid. The solution was filtered through Celite, and the filter and flask were washed with 20 ml. of formic acid. The filtrate and washings were combined and cooled with stirring in an ice bath, and a cold solution of 11.1 g. of nitrosyl chloride in 100 ml. of 98 percent formic acid was added over a period of 2 minutes. The mixture was further stirred with cooling for 3 minutes, and was then evaporated to a thick paste in a rotary flask evaporator at room temperature and reduced pressure. The paste was dissolved in 150 ml. of water. The solution was cooled in an ice bath, and concentrated ammonia was added dropwise with stirring to pH 3.5, causing a solid to precipitate. The resulting slurry was allowed to stand in an ice bath for 0.5 hour, and was filtered. The solids were washed on the filter twice with small portions of cold water, then twice with cold acetone, and were then dried. The dry product weighed 6.14 g., and had a maximum in its ultraviolet spectrum at 264 m$\mu$ ($\epsilon$=7900). It was shown to be 7-aminocephalosporanic acid by paper chromatography and bioautographic assay.

*Example 2*

Five grams of cephalosporin C were dissolved in 300 ml. of glacial acetic acid, and 1.4 g. of nitrosyl chloride in approximately 50 ml. of glacial acetic acid were added at ordinary temperature over a period of one minute. The mixture was stirred for 10 minutes, then evaporated to near dryness at room temperature and reduced pressure. Approximately 100 ml. of distilled water were added, yielding a clear orange-red solution. Dilute aqueous sodium hydroxide solution was added to pH 3.5. The solution was then concentrated at room temperature and reduced pressure to around 20–30 ml., at which point a crystalline precipitate formed. The precipitate was filtered off, washed with water, then with acetone, and dried. It weighed 194 mg. and its ultraviolet spectrum showed a maximum at 263 m$\mu$ ($\epsilon$=7820). It was shown to be 7-aminocephalosporanic acid by paper chromatography and bioautographic assay.

*Example 3*

Cephalosporin C (10 mg.) was dissolved in 0.5 ml. of glacial acetic acid. To the solution was added 0.36 ml. of a solution of $N_2O_4$ in glacial acetic acid having a concentration of 0.059 millimole per milliliter. The mixture was kept in an ice bath at 15–16° C. for 20 minutes, and was then evaporated to near dryness at room temperature and reduced pressure. The residue, weighing 13 mg., was taken up in a minimum quantity of water. The solution, having a pH of 2.5, was adjusted to pH 7.3 with aqueous sodium hydroxide solution, then diluted to 10 ml. with distilled water, and analyzed. Paper chromatography and bioautographic assay of the solution, after acylation with phenoxyacetyl chloride, showed two biologically active spots; before acylation, only one; thus confirming the presence of 7-aminocephalosporanic acid therein.

*Example 4*

A solution of 10 mg. of cephalosporin C in 10 ml. of glacial acetic acid was commingled with a solution of 5 mg. of N-nitroso-3-nitrocarbazole in 6 ml. of acetonitrile, and the mixture was held at 60° C. for one hour, after which it was stripped to near dryness under vacuum at mild temperature. The residue was dissolved in water and extracted into ethyl acetate at pH 2, then back-extracted into aqueous potassium hydroxide solution at pH 5.5. The final solution was diluted to 10 ml. and submitted for analysis. Paper chromatography and bioautographic assay demonstrated the presence of 7-aminocephalosporanic acid therein at a concentration corresponding to 1.1 penicillin G units per milliliter.

*Example 5*

Cephalosporin C (800 mg.) was dissolved in 35 ml. of water at pH 5.3, and the solution was adjusted to just below pH 2.2 with 1 N hydrochloric acid. To the solution was added N-bromosuccinimide (300 mg.), and the mixture was stirred for 10 minutes at room temperature, during which time it developed a yellow color. It was then adjusted to pH 6.7 with aqueous 1 N potassium hydroxide and filtered to remove insoluble materials. The filtrate was evaporated to dryness at ordinary temperature under vacuum. The residue, weighing 770 mg., was shown by paper chromatography and bioautographic assay to contain 7-aminocephalosporanic acid.

We claim:
1. The process which comprises subjecting a 7-(5'-amino-N'-adipamyl) cephalosporin C compound to reaction with a substance selected from the class consisting of nitrosating agents, carbocyclic arenediazonium salts, and substances affording positive halogen, whereby the 5'-amino group is split off and a transient intermediate is obtained,

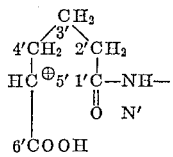

having an electron-deficient center at the 5' carbon atom, which intermediate cyclizes spontaneously through the 1'-carboxamido oxygen to produce a second intermediate having the cyclic group

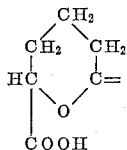

attached through the double bond thereof to the N' atom, and subjecting said second intermediate to hydrolytic cleavage, whereby said cyclic group attached to the N' atom is cleaved therefrom, yield the corresponding 7-aminocephalosporanic acid nucleus.

2. The process which comprises commingling a 7-(5'-amino-N'-adipamyl) cephalosporin C compound with an inert polar solvent therefor, commingling therewith a substance affording positive halogen under the reaction conditions in a proportion sufficient to react with the 5'-amino group thereof, and contacting the reaction product with water, whereby the 5'-amino-N'-adipamyl group is converted and cleaved, yielding the corresponding 7-aminocephalosporanic acid.

3. The process of claim 2 wherein said substance affording positive halogen is N-bromosuccinimide.

4. The process which comprises commingling a 7-(5'-amino-N'-adipamyl) cephalosporin C compound with an inert polar solvent therefor, commingling therewith a nitrosating agent in a proportion sufficient to react with the 5'-amino group thereof, and contacting the reaction product with water, whereby the 5'-amino-N'-adipamyl group is converted and cleaved, yielding the corresponding 7-aminocephalosporanic acid.

5. The process of claim 4 wherein said inert polar organic solvent is acetic acid.

6. The process of claim 4 wherein said nitrosating agent is nitrogen tetroxide.

7. The process of claim 4 wherein said nitrosating agent is N-nitroso-3-nitrocarbazole.

8. A method for preparing 7-aminocephalosporanic acid which comprises subjecting 7-(5'-amino-N'-adipamyl) cephalosporin C to treatment in an inert polar organic solvent therefor with a nitrosating agent at a temperature below about 50° C., the molar ratio of said nitrosating agent to cephalosporin C being above about 1:1, removing said solvent from the reaction product mixture, dissolving the residual mixture in water, adjusting the pH thereof to a level between about 2.5 and about 5, and crystallizing 7-aminocephalosporanic acid therefrom.

9. A method for preparing 7-aminocephalosporanic acid which comprises subjecting 7-(5'-amino-N'-adipamyl) cephalosporin C to treatment in an inert polar organic solvent therefor with a nitrosating agent at a temperature below about 50° C., the molar ratio of said nitrosating agent to said 7-(5'-amino-N'-adipamyl) cephalosporin C being around 2:1, removing said solvent from the reaction product mixture, dissolving the residual mixture in water, adjusting the pH thereof to a level between about 3.5 and about 4, and crystallizing 7-aminocephalosporanic acid therefrom.

10. The method of claim 9 wherein said solvent is formic acid.

11. A method for preparing 7-aminocephalosporanic acid which comprises dissolving 7-(5'-amino-N'-adipamyl) cephalosporin C in formic acid, adding thereto nitrosyl chloride in a molar ratio to cephalosporin C around 2:1 at a temperature below about 50° C., distilling the formic acid from the reaction product mixture under vacuum at ordinary temperature, dissolving the residual mixture in water, adjusting the pH thereof to a level between about 3.5 and about 4, and crystallizing 7-aminocephalosporanic acid therefrom.

12. A method for preparing 7-aminocephalosporanic acid which comprises dissolving 7 - (5' - amino-N'-adipamyl) cephalosporin C in substantially anhydrous formic acid, commingling therewith nitrosyl chloride in a molar ratio to cephalosporin C around 2:1 at a temperature between about 20 and about 30° C., distilling the formic acid from the reaction product mixture under vacuum at ordinary temperature, dissolving the residual mixture in water, adjusting the pH thereof to a level between about 3.5 and about 4, and crystallizing 7-aminocephalosporanic acid therefrom.

References Cited by the Examiner
FOREIGN PATENTS
810,196   3/59   Great Britain.
847,375   9/60   Great Britain.

OTHER REFERENCES
Morin: Jour. Amer. Chem. Soc., vol. 84, pages 3400–1 (1962).

NICHOLAS S. RIZZO, *Primary Examiner.*
WALTER A. MODANCE, *Examiner.*